June 4, 1957     F. J. ALBACH     2,794,286
FISHING LURE
Filed March 11, 1955
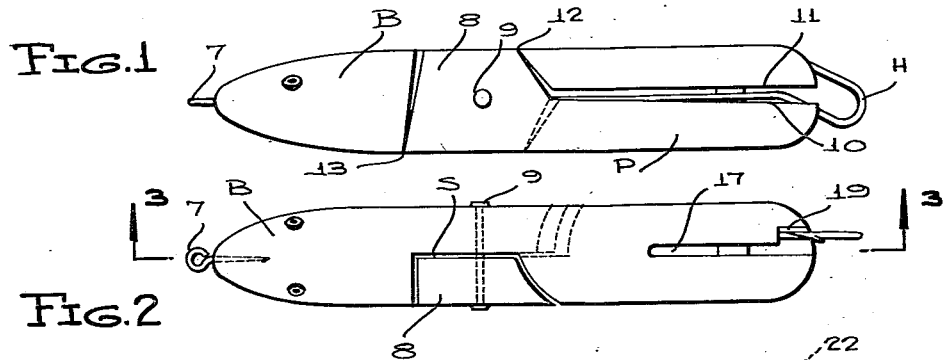
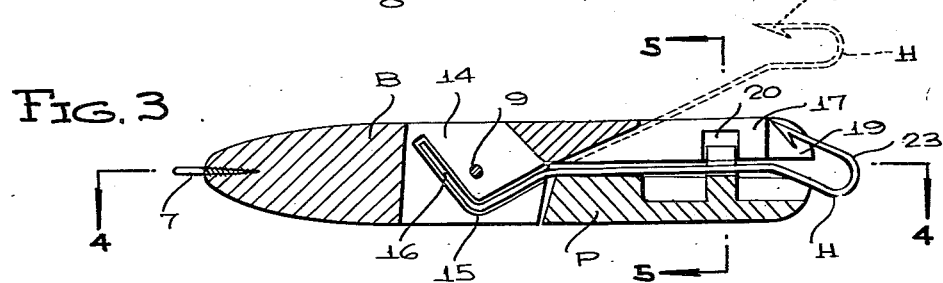
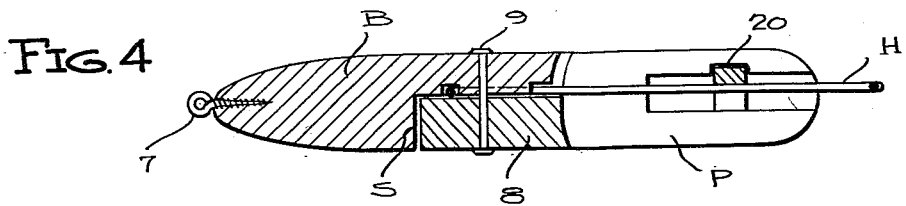
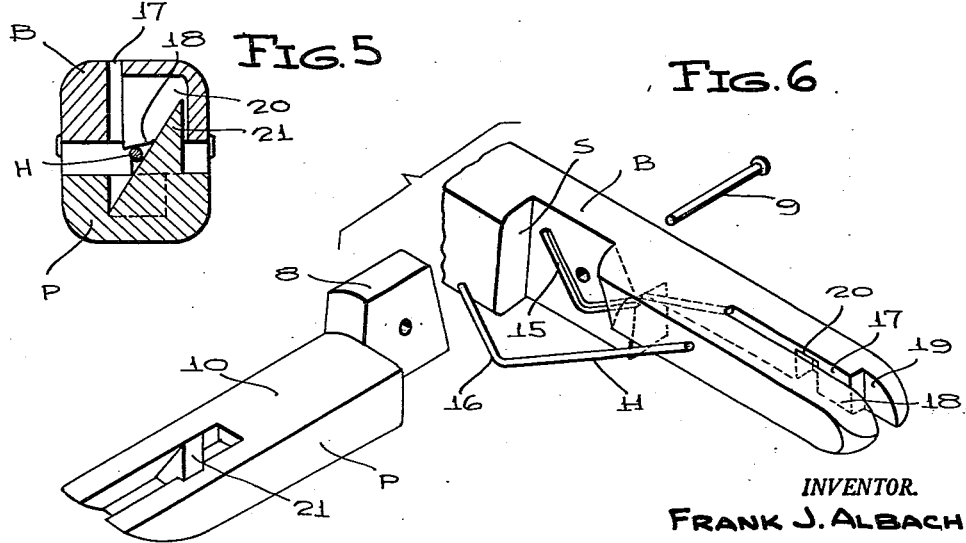
INVENTOR.
FRANK J. ALBACH
BY
McMorrow, Berman & Davidson
ATTORNEYS.

United States Patent Office 2,794,286
Patented June 4, 1957

2,794,286

FISHING LURE

Frank J. Albach, St. Petersburg, Fla.

Application March 11, 1955, Serial No. 493,711

1 Claim. (Cl. 43—35)

This invention relates, in general, to fishing lures and has more particular reference to a lure having a hook of spring metal which can be held in a retracted position and then released to its exposed position when pressure is exerted upon the two parts of the lure as when taken into a fish's mouth.

One purpose of the invention is to minimize the occurrence of the lure becoming snagged and hung up while being drawn through various underwater hazards, such as weeds, brush, and rocks.

Another object is to have a hook that springs to exposed position, so as to cause it to set itself into the fish's mouth.

Another object is to have the crook end of the hook extend beyond the body of the lure, so as to provide a convenient place to grasp it in order to reset it, and also to provide a place to carry a supplementary bait if desired.

Further objects, purposes and characteristic features of the invention will appear as the description progresses, reference being made to the accompanying drawings showing, solely by way of example, and in no way in a limiting sense, one form which the invention can assume.

In the drawings:

Figure 1 is a side elevation of a lure in accordance with this invention;

Figure 2 is a top plan view of the lure;

Figure 3 is a sectional view on line 3—3 of Figure 2 and viewed in the direction of the arrows;

Figure 4 is a sectional view on line 4—4 of Figure 3 and viewed in the direction of the arrows;

Figure 5 is a section on line 5—5 of Figure 3 and viewed in the direction of the arrows; and Figure 6 is an exploded view of a part of the lure.

Referring now to the drawings, the lure is shown as an elongated member comprised by a body member B and a pivot jaw member P. At the head end of B is a screw eye 7 for attachment of a fish line.

Intermediate the ends of body B is a laterally opening recess or transverse pivot slot S extending through half the width of the body and receiving a pivot lug 8 on pivot member P with a pivot pin 9 holding the parts together. Rearwardly of the recess S, the underside of the body B is cut away through substantially half the height of the body, fully from the recess to the tail end of the body. The pivot jaw has a main portion (see Figure 6) extending the full width of the body and substantially filling the downwardly opening recess defined by cutting away of the underside of the body B, the head 8 of the jaw being of a height substantially equal to that of the body and of a width substantially half that of the body and main portion of the pivot jaw. The top face 10 of member P can move toward and away from the lower face 11 of body B on its pivot pin 9 to form a pair of jaws opening up vertically. The width of jaw opening is limited by the edges of slot S and lug 8 as indicated at 12 and 13.

In the inner wall or face 14 of pivot slot S is an open, angular groove 15 to receive and hold the bent shank end 16 of a fish hook H. An operating slot 17 is formed in the body member B and extends vertically therethrough, from the tail end up to the groove 15, whereby to permit the hook H to spring up through this slot, from its retracted, to its exposed position, when properly operated.

The lower face 11 of member B has a downwardly sloping portion or stop shoulder 18 adjacent slot 17 and to one side thereof to securely hold the hook in retracted position.

Offset, and to one side of slot 17, and at the tail end of body B, is a storage slot 19, and inwardly of the tail end of member B, and in the side wall of slot 17 which is adjacent the storage slot 19, is an operating socket 20, into which projects an operating cam 21, carried on face 10 of member P.

From the above description, the operation of the lure should be apparent. Hook H, of springy material, is held by its shank end, in groove 15, and between slot face 14 and lug 8. In its retracted position, as shown in full line in Figure 3, it has been forced down, from its dotted line position, through slot 17, and then moved sidewise to the right, as viewed in Figure 5, to be held under sloping portion 18. It also bears against the sloping face of cam 21 to thereby separate faces 10 and 11 on members B and P, so as to hold the jaws open. In this retracted position the barb end 22 of hook H lies in the storage slot 19 while the crooked portion 23 extends beyond and outside of the body of the lure.

Upon the faces 10 and 11 being forced together as by a fish taking the lure into its mouth, so as to close the jaws, cam 21 forces the hook to the left as viewed in Figure 5 and into slot 17, whereupon, it springs out of the slot to its exposed position as shown in dotted lines in Figure 3.

The above rather specific description of one form which the invention can assume is given solely by way of example and is not intended, in any manner, whatsoever, in a limiting sense.

It is to be understood that all such modifications, alterations, and adaptions, as come within the scope of the appended claim are intended to be protected by this disclosure.

Having described the invention, it is now claimed:

A fish lure comprising a body formed intermediate its ends with a laterally opening recess extending through substantially half the width of the body, and having a downwardly opening longitudinal recess communicating with the first recess and extending fully from the first recess to one end of the body, said body including a downwardly facing shoulder intermediate the opposite ends of the second recess, the body having a longitudinal slot communicating with the top surface of the body and with the second named recess with the shoulder being disposed at one side of said slot, said body further having an angular groove formed in the inner wall of the first recess; a pivot jaw formed at one end with a head seating in the first recess, the pivot jaw including a main portion rigid with the head and extending within the second recess, said portion of the pivot jaw, intermediate its opposite ends, being formed with a sloped surface providing a cam; means pivotally connecting said head to the body for rocking motion of the pivot jaw about an axis extending transversely of the body intermediate opposite ends thereof, said sloped surface of the pivot jaw portion lying obliquely to the plane of swinging movement of the pivot jaw about said pivot axis; and a hook including a shank formed at one end with an angular portion seating in said groove, said head holding said angular portion in the groove, the hook shank adjacent the angular portion thereof being tensioned to normally swing upwardly within said slot and the hook having a barb at one end exposed on upward swinging of the shank within the slot, said shank of the hook intermediate opposite ends thereof being disposed for engagement under the shoulder and the cam being adapted to bias the shoulder-engaged shank laterally on swinging movement of the pivot jaw toward the body to free the shank from engagement by said shoulder, whereby to permit upward swinging movement of the shank within the slot, and said shank when engaged by the shoulder bearing downwardly upon the said portion of the pivot jaw to hold the pivot jaw in spaced relation to the adjacent part of the body.

References Cited in the file of this patent

UNITED STATES PATENTS

| | | |
|---|---|---|
| 925,482 | Kahlo | June 22, 1909 |
| 1,348,670 | Viehweger | Aug. 3, 1920 |
| 1,464,215 | Olson | Aug. 7, 1923 |